(12) United States Patent
Irie et al.

(10) Patent No.: US 10,877,345 B2
(45) Date of Patent: Dec. 29, 2020

(54) LIGHT CONTROL FILM AND VEHICLE BODY PANEL INCLUDING THE SAME

(71) Applicants: TOYOTA BOSHOKU KABUSHIKI KAISHA, Aichi (JP); RIKEN TECHNOS CORPORATION, Tokyo (JP); TDK CORPORATION, Tokyo (JP)

(72) Inventors: Masahiro Irie, Aichi-ken (JP); Kanji Kobayashi, Gifu-ken (JP); Kenji Okamoto, Aichi-ken (JP); Nozomu Washio, Tokyo (JP); Koji Mishima, Tokyo (JP); Shouhei Harada, Tokyo (JP); Kazushi Yamada, Tokyo (JP)

(73) Assignees: TOYOTA BOSHOKU KABUSHIKI KAISHA, Aichi (JP); RIKEN TECHNOS CORPORATION, Tokyo (JP); TDK CORPORATION, Tokyo (JP)

( * ) Notice: Subject to any disclaimer, the term of this patent is extended or adjusted under 35 U.S.C. 154(b) by 0 days.

(21) Appl. No.: 16/667,129

(22) Filed: Oct. 29, 2019

(65) Prior Publication Data

US 2020/0142226 A1 May 7, 2020

(30) Foreign Application Priority Data

Nov. 5, 2018 (JP) .................. 2018-207917

(51) Int. Cl.
| | | |
|---|---|---|
| G02F 1/139 | (2006.01) | |
| G02F 1/1333 | (2006.01) | |
| G02F 1/1343 | (2006.01) | |
| B60J 3/04 | (2006.01) | |

(Continued)

(52) U.S. Cl.
CPC ............... *G02F 1/139* (2013.01); *B60J 3/04* (2013.01); *C08J 5/18* (2013.01); *G02F 1/13439* (2013.01); *G02F 1/133305* (2013.01); *C08J 2333/24* (2013.01); *C08J 2369/00* (2013.01); *G02F 1/1339* (2013.01); *G02F 2202/022* (2013.01); *G02F 2203/01* (2013.01)

(58) Field of Classification Search
None
See application file for complete search history.

(56) References Cited

U.S. PATENT DOCUMENTS

| | | | |
|---|---|---|---|
| 2003/0001992 A1* | 1/2003 | Kawase | ............... B41J 2/14233 349/106 |
| 2017/0198164 A1* | 7/2017 | Itagaki | .................... B32B 27/20 |
| 2020/0124900 A1* | 4/2020 | Zhou | ................. C09K 19/3852 |

FOREIGN PATENT DOCUMENTS

JP 2017-62361 3/2017

* cited by examiner

*Primary Examiner* — James A Dudek
(74) *Attorney, Agent, or Firm* — Greenblum & Bernstein, P.L.C.

(57) ABSTRACT

A light control film to be bonded to a panel member for a vehicle includes film substrates, conductive layers, and a liquid crystal layer. The conductive layers are on surfaces of the film substrates opposed to each other, respectively. The liquid crystal layer is sandwiched between conductive layers. The light control film is switchable between a first state with a first haze percentage and a second state with a second haze percentage that is lower than the first haze percentage. Each film substrate includes at least an acrylic imide layer made of acrylic imide. Each conductive layer includes a thin silver film or a copper wire mesh.

7 Claims, 4 Drawing Sheets

(51) Int. Cl.
*C08J 5/18* (2006.01)
*G02F 1/1339* (2006.01)

|  | FORMABILITY | TRANSMITTANCE | UV BLOCK | SCRATCH-PROOF |
|---|---|---|---|---|
| PET | FAIR | 89 | GOOD | GOOD |
| ACRYLIC IMIDE | EXCELLENT | 91 | GOOD | GOOD |

FIG.5

|  | CONDUCTIVITY WHEN FLATTENED | CONDUCTIVITY WHEN CURVED | TRANSPARENCY | COST |
|---|---|---|---|---|
| ITO | EXCELLENT | POOR | EXCELLENT | POOR |
| THIN SILVER FILM | GOOD | GOOD | GOOD | GOOD |
| COPPER WIRE MESH | GOOD | GOOD | GOOD | GOOD | ns
LIGHT CONTROL FILM AND VEHICLE BODY PANEL INCLUDING THE SAME

CROSS REFERENCE TO RELATED APPLICATION

This application claims priority from Japanese Patent Application No. 2018-207917 filed on Nov. 5, 2018. The entire contents of the priority application are incorporated herein by reference.

TECHNICAL FIELD

The technology described herein relates to a light control film and a vehicle body panel including the light control film.

BACKGROUND

A light control film affixed to a window may include two film substrates, conductive layers, and a liquid crystal layer. The film substrates are opposed to each other and the conductive layers are formed on opposed surfaces of the film substrates, respectively. The liquid crystal layer is sandwiched between the conductive layers on the film substrates. During formation of the conductive layers on the film substrates, the film substrates are placed on plates. To reduce warps or wrinkles of the film substrates during the formation of the conductive layers on the film substrates, a holding layer, a conductive layer, and an alignment layer are formed in this sequence on each plate and then, a laminate including the holding layer, the conductive layer, and the alignment layer is removed from the plate and bonded to the corresponding film substrate.

The film substrates in such a light control film are made of polyethylene terephthalate (PET) or polycarbonate (PC). The conductive layer is made of indium tin oxide (ITO), which forms a transparent electrode. The light control film having such a configuration may be affixed to a flat surface such a window surface or a gently curved surface. An interior component or an exterior component of a vehicle includes portions having complicated contours. If the light control film is used for the interior component or the exterior component, the light control film may be stretched to conform to the complicated contours of the portions of the interior component or the exterior component. In the conductive layer made of ITO in the control film that is stretched, a crack may occur. As a result, conductivity may significantly decrease and light control performance may not be exerted. ITO, more specifically, indium is rear metal, that is, expensive. A heatproof temperature of widely used PET is relatively low. PET or PC may not be appropriate for the interior component or the exterior component that may be heated to a relatively high temperature.

SUMMARY

The technology described herein was made in view of the foregoing circumstances. An object is to provide a light control film to be bonded to a panel member for a vehicle along complicated contours of the panel member at lower cost. Another object is to provide a vehicle body panel including a panel member having a portion in complicated contours and a light control film bonded to the panel member without any gaps between the panel member and the light control film at lower cost.

A light control film to be bonded to a panel member for a vehicle includes two film substrates, two conductive layers, and a liquid crystal layer. The film substrates include opposed surfaces that are opposed to each other. The conductive layers are on the opposed surfaces, respectively. The liquid crystal layer is sandwiched between the conductive layers. The light control film is switchable between a first state with a first haze percentage and a second state with a second haze percentage that is lower than the first haze percentage. Each of the film substrates includes at least an acrylic imide layer made of acrylic imide. Each of the conductive layers includes one of a thin silver film and a copper wire mesh.

The acrylic imide that is a material of the acrylic imide layer of each film substrate has a heat resistance higher than a heat resistance of PET. Therefore, the film substrates including the acrylic imide layers are preferable for the vehicle body panel to film substrates including PET layers. A temperature at which the film substrates including the acrylic imide layers are soften is lower than that of the film substrate including the PET layers. Namely, the film substrates including the acrylic imide layers have formability higher than that of the film substrates including the PET layers. The thin silver film or the copper wire mesh included in each conductive layer has transparency lower than that of ITO but has flexibility higher than that of ITO. Therefore, the light control film including such conductive layers can be more easily shaped along complicated contours of the panel member. Furthermore, silver or copper is less expensive than indium. Therefore, the production cost of the light control film can be reduced in comparison to a light control film including conductive layers made of ITO.

Acrylic imide can add ultraviolet blocking properties and scratch-proof properties to the film substrates and thus the light control film including the acrylic imide layers are preferable for the vehicle body panel. The conductive layers including the thin silver films can block about 50% of light rays with wavelengths longer than the wavelengths of infrared rays (the light rays that heat an object). With the light control film, an increase in temperature inside the vehicle can be suppressed.

A vehicle body panel for a vehicle includes a panel member and a light control film. The panel member includes at least one flat portion and at least one curved portion. The light control film is bonded to the panel member without any gaps between the panel member and the light control film. The light control film includes two film substrates, two conductive layers, and a liquid crystal layer. The film substrates include opposed surfaces opposed to each other. The conductive layers are on the opposed surfaces, respectively. The liquid crystal layer is sandwiched between the conductive layers. The light control film is switchable between a first state with a first haze percentage and a second state with a second haze percentage that is lower than the first haze percentage. Each of the film substrates includes at least an acrylic imide layer made of acrylic imide. Each of the conductive layers includes one of a thin silver film and a copper wire mesh.

Because the light control film according to the technology described herein has the flexibility higher than flexibility of known light control films, the light control film is shaped along surfaces of portions of the panel member and bonded to the surfaces without any gaps. The light control film is integrated with the panel member and thus less likely to be recognized by a passenger in the vehicle.

According to the technology described herein, a vehicle body panel including a panel member having complicated contours and a light control film bonded to the panel member without any gaps between the panel member and the light control film is provided at lower cost.

DETAILED DESCRIPTION

An embodiment will be described in detail with reference to the drawings.

Figure 1:
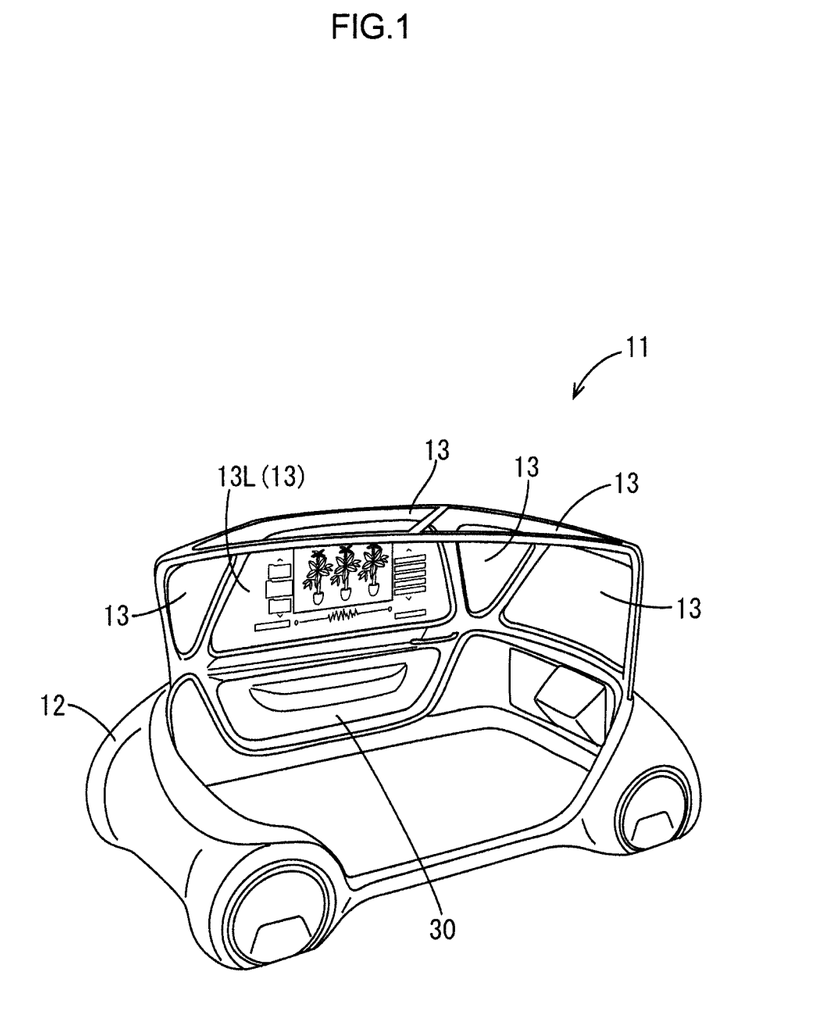
FIG. 1 is a perspective view of a vehicle including a light control film according to an embodiment.

As illustrated in FIG. 1, a vehicle 11 includes light control films 10 (an example of a light control film for a vehicle) according to this embodiment. The vehicle 11 is a fully autonomous self-driving vehicle, that is, the vehicle 11 does not include a driver's sheet. An arrangement of sheets in the vehicle 11 is relatively flexible. To clarify an inside of the vehicle 11, some portions of the vehicle 11 are illustrated in a cross-sectional view.

Figure 2:
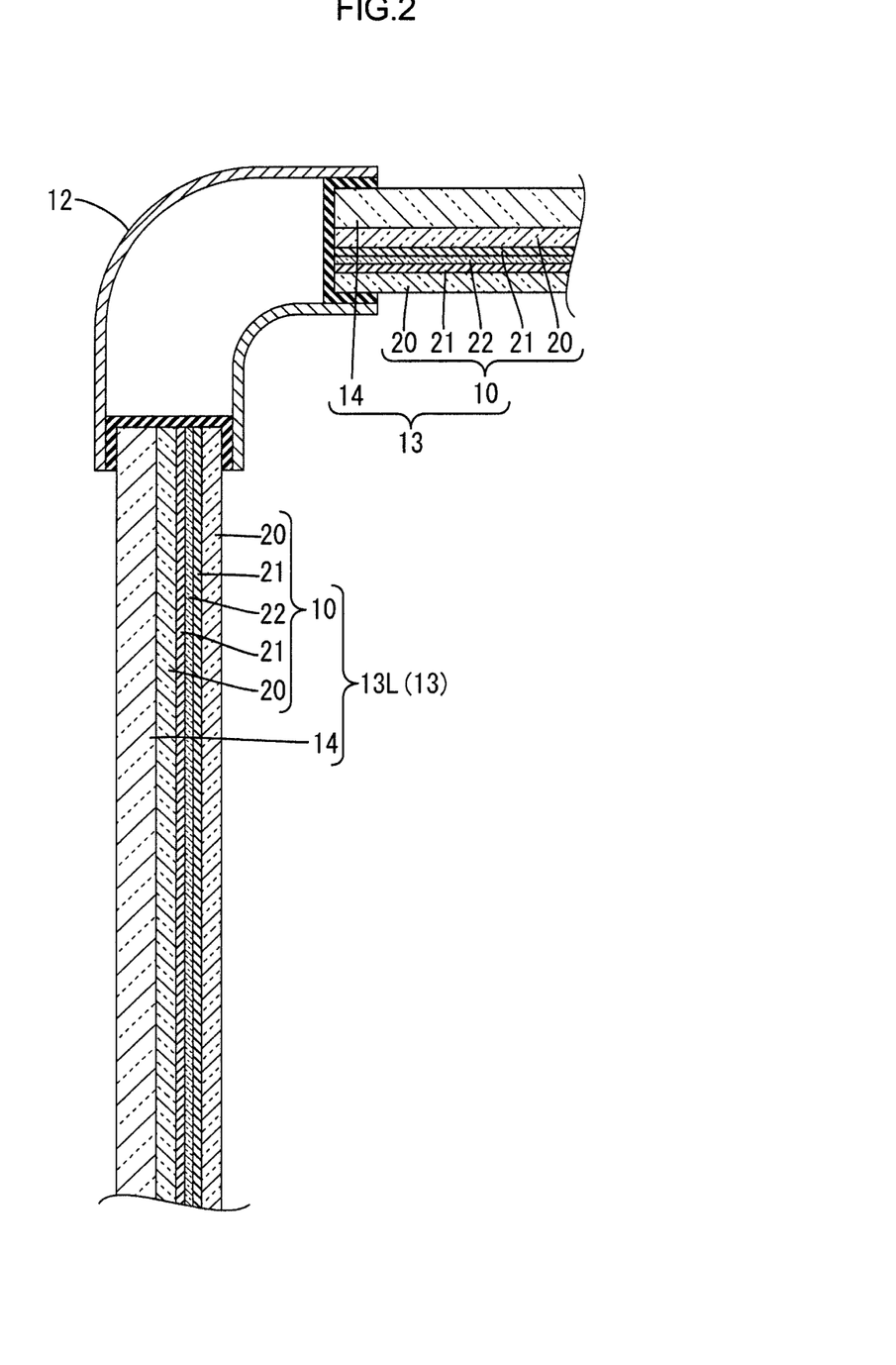
FIG. 2 is a cross-sectional view of an upper section of a side portion of the vehicle.

The vehicle 11 includes a vehicle body 12 and windows 13. An upper section of an interior space of a cabin of the vehicle 11 is covered with the windows 13 and provided as a wide open space. Namely, the windows 13 define a front, a rear, sides, and a top of an upper portion of the cabin of the vehicle 11. The windows 13 have similar configurations. As illustrated in FIG. 2, the windows 13 include the light control films 10 and panel members 14. Each panel members 14 is made of a substantially transparent resin material (e.g., polycarbonate, acrylic) and formed in a plate shape. The light control films 10 are bonded to surfaces of the panel members 14 facing the interior space of the cabin. Each of the light control films 10 is switchable between a first state with a first haze percentage (80% or higher, hereinafter referred to as a non-transparent state) and a second state with a second haze percentage that is lower than the first haze percentage (small haze %, hereinafter referred to as a transparent state). The windows 13 function as see-through windows in the transparent state and as blinds to hinder a person from viewing an inside of the cabin of the vehicle 11 or a passenger in the vehicle 11 from viewing an outside of the cabin. In FIG. 1, one of the windows 13 on the left of the vehicle 11 is referred to as a side window 13L. The side window 13L is configured such that images are projected thereon when the side window 13L is in the non-transparent state. The switching of the transparent state and the non-transparent state can be individually controlled for each window 13.

As illustrated in FIG. 2, each light control film 10 includes two film substrates 20, two conductive layers 21, and a liquid crystal layer 22. The film substrates are substantially transparent films opposed to each other. The conductive layers 21 are formed on opposed surfaces of the film substrates 20, respectively. The liquid crystal layer 22 is disposed between the conductive layers 21 on the film substrates 20. The film substrates 20 are made of acrylic imide. The conductive layers 21 include thin silver films. The conductive layers 21 including the thin silver films are formed on the opposed surfaces of the film substrates 20 through spattering. The film substrates 20 on which the conductive layers 21 are formed are held with a gap equal to the thickness of the liquid crystal layer 22 and bonded together with a sealant that seals the liquid crystal layer 22. The liquid crystal layer 22 includes liquid crystal molecules that are substances with optical characteristics that vary according to application of voltage. When a voltage is applied to the conductive layer 21, an electric field is produced in the liquid crystal layer 22 and orientation of the liquid crystal molecules changes. Through on-off control of voltage application to the conductive layer 21, the switching of the light control film 10 between the transparent state and the non-transparent state is performed.

Figure 3:
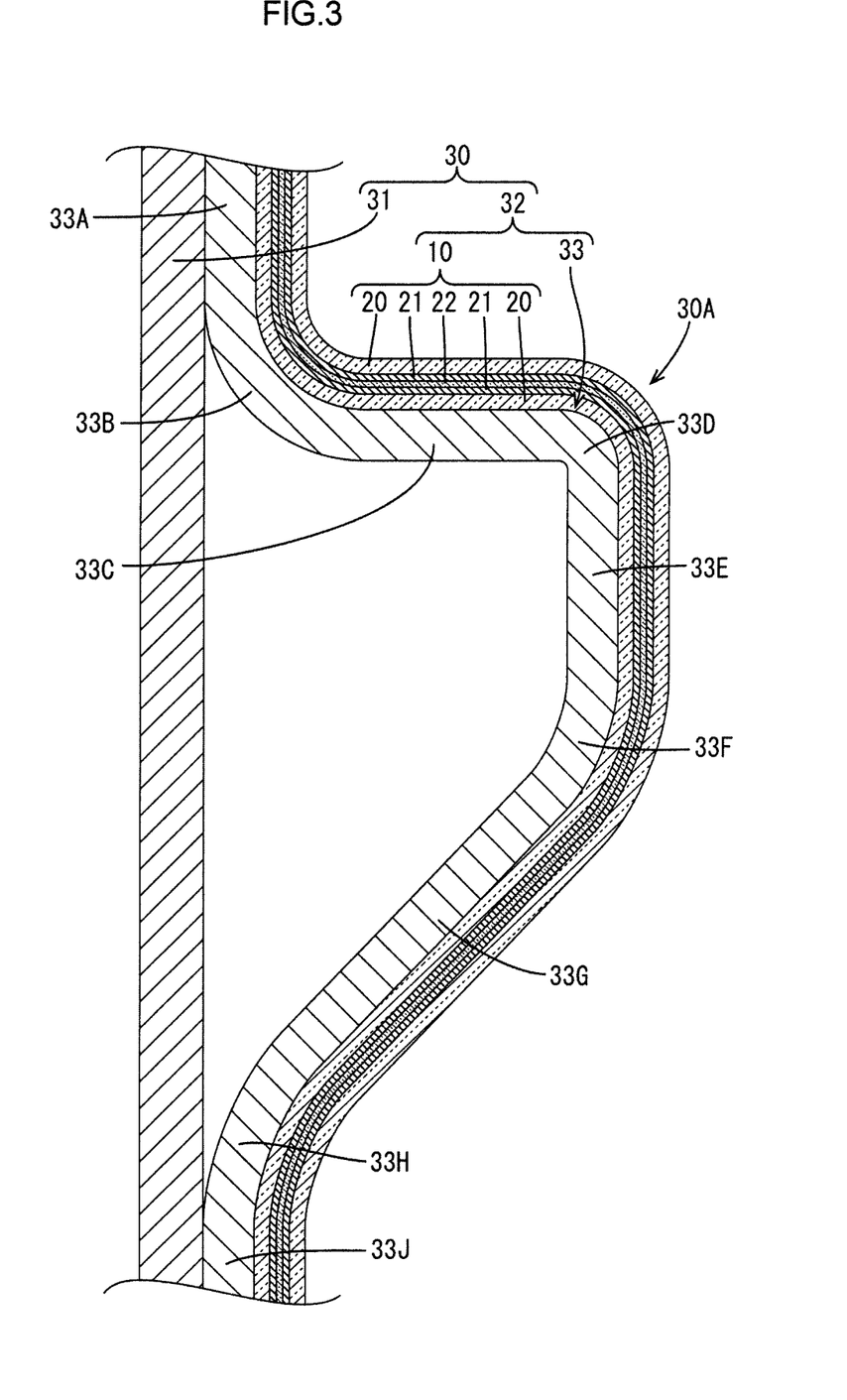
FIG. 3 is a cross-sectional view of a lower section of the side portion of the vehicle.

The light control film 10 is used in a lower section of the side portion of the vehicle body 12. As illustrated in FIG. 1, the side portion of the vehicle body 12 includes a side panel 30 (a vehicle body panel) located in the lower section. The side panel 30 includes a protrusion 30A that protrude toward an inner side of the cabin. The protrusion 30A may include an armrest. As illustrated in FIG. 3, the side panel 30 includes an outer panel 31 and an inner panel 32. The outer panel 31 forms an outer sidewall of the cabin and the inner panel 32 forms an inner sidewall of the cabin. The outer panel 31 is a substantially transparent resin board (e.g., a polycarbonate board, an acrylic board). The inner panel 32 includes a panel member 33 and the light control film 10 that is integrated with the panel member 33. The panel member 33 is made of a substantially transparent resin material (e.g., polycarbonate, acrylic). The light control film 10 is bonded to a surface of the panel member 33 facing the interior space of the cabin. The outer panel 31 and the inner panel 32 are assembled into the side panel 30. Through the switching of the light control film 10 between the transparent state and the non-transparent state, the side panel 30 is switchable between a transparent state and a non-transparent state.

The panel member 33 includes a first flat portion 33A, a first curved portion 33B, a second flat portion 33C, a second curved portion 33D, a third flat portion 33E, a third curved portion 33F, a fourth flat portion 33G, and a fourth curved portion 33H, and a fifth flat portion 33J. The first flat portion 33A is located below the side window 13L and vertically oriented. The first curved portion 33B extends from a lower edge of the first flat portion 33A and curves toward the inner side of the cabin. The first curved portion 33B connects the second flat portion 33C to the first flat portion 33A. The second flat portion 33C horizontally extends from an end of the first curved portion 33B on an opposite side from the first flat portion 33A. The second curved portion 33D extends from an end of the second flat portion 33C on an opposite side form the first curved portion 33B and curves downward toward the third flat portion 33E. The second curved portion 33D connects the third flat portion 33E to the second flat portion 33C. The third flat portion 33E vertically extends from an end of the second curved portion 33D on an opposite side form the second flat portion 33C. The third curved portion 33F curves toward the fourth flat portion 33G located a lower outer side of the cabin relative to the third flat portion 33E. The fourth flat portion 33G extends from an end of the third curved portion 33F on an opposite side from the third flat portion 33E toward a lower side portion of the outer panel 31. The fourth curved portion 33H extends from an end of the fourth flat portion 33G on an opposite side from the third curved portion 33F and curves downward toward the fifth flat portion 33J. The fifth flat portion 33J extends downward from an end of the fourth curved portion 33H on an opposite side from the fourth flat portion 33G.

The second flat portion 33C is at an angle, more specifically, perpendicular relative to the first flat portion 33A. The third flat portion 33E and the fifth flat portion 33J are parallel to the first flat portion 33A. The third flat portion 33E is at an angle, more specifically, perpendicular relative to the second flat portion 33C. The fourth flat portion 33G is at an angle relative to the third flat portion 33E and the fifth flat portion 33J.

The first curved portion 33B, the second curved portion 33D, the third curved portion 33F, and the fourth curved portion 33H have a first degree of curvature, a second degree of curvature, a third degree of curvature, and a fourth degree of curvature, respectively. At least two of the first to the fourth degrees are different. For example, the first degree is larger than the second degree, the third degree is larger than the first degree, and the fourth degree is larger than the third degree. The first curved portion 33B connects the second flat portion 33C to the first flat portion 33A. The second curved portion 33D connects the third flat portion 33E to the second flat portion 33C. The third curved portion 33F connects the fourth flat portion 33G to the third flat portion 33E. The fourth curved portion 33H connects the fifth flat portion 33J to the fourth flat portion 33G.

The light control film 10 is shaped along complicated contours of the panel member 33 including the curved portions 33B, 33D, 33F, and 33H that form portions of the protrusion 30A. Even at the curved portions 33B, 33D, 33F, and 33H of the panel member 33, the light control film 10 is fixed to the panel member 33 without any gaps between the panel member 33 and the light control film 10.

Figure 4:
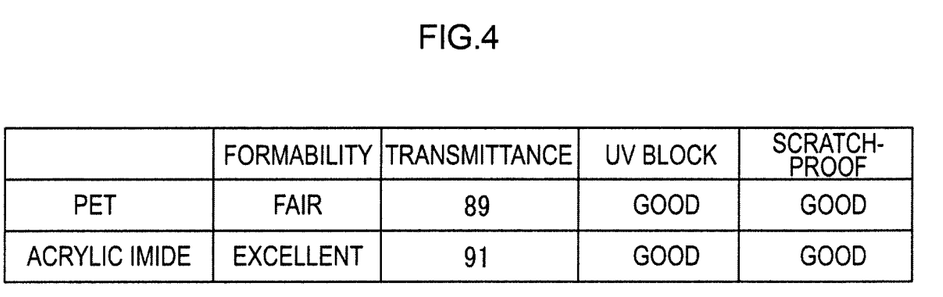
FIG. 4 is a material comparison chart illustrating results of comparison between materials for film substrates included in the light control film.

A comparison between the material of the light control film 10 and a material of a regular light control film will be discussed. As illustrated in FIG. 4, the acrylic imide that is the material of the film substrates 20 has light transmissivity of 91%, which is about equal to that of the PET. The film substrates 20 made of acrylic imide are resistant to ultraviolet radiation (capable of blocking 99% UV rays) and scratch-proof. If the film substrates 20 are made of PET, similar effects can be achieved. However, a heat-proof temperature of PET is in a range from 100° C. to 120° C. while a heat-proof temperature of acrylic imide is about 150° C. Namely, the acrylic imide is more preferable for an interior component or an exterior component of a vehicle that requires a higher level of heat protection. Furthermore, a softening temperature of PET is about 260° C. which a softening temperature of acrylic imide is about 160° C. Namely, the acrylic imide is easier to shape.

The acrylic imide will be described in detail. The acrylic imide is a thermoplastic resin having an acrylic structure and an imide structure. Because the acrylic imide has the acrylic structure, the acrylic imide has characteristics of an acrylic resin, that is, high transparency, high surface hardness, and high rigidity. Furthermore, because the acrylic imide has the imide structure, the acrylic imide has characteristics of the polyimide, that is, high heat resistance and dimension stability. Polyimide has a disadvantage that polyimide has a tendency to be tinted in color ranging from light-yellow to red-brown. Such disadvantage is resolved in acrylic imide.

Examples of the acrylic imide include a copolymer such as N-substituted maleimide-methyl (meth)acrylate including (meth)acrylate ester and a polymerizable monomer having an imide structure and a copolymer having an imide structure obtained by reaction of an acrylic resin such as polymethyl (meth)acrylate and a styrene-methyl (meth)acrylate copolymer with an imidizing agent (such as methylamine, cyclohexylamine, and ammonia). The acrylic imide may be one of the above-described polymers or a mixture of two or more of the above-described polymers. (Meth)acrylate described herein refers to acrylic acid or methacrylic acid.

To achieve a preferable heat resistance, a glass-transition temperature of the acrylic imide may be 125° C. or higher, preferably 130° C. or higher, more preferably 135° C. or higher, still more preferably 140° C. or higher, yet still more preferably 145° C. or higher, and most preferably 150° C. or higher. To achieve preferable formability, the glass-transition temperature of the acrylic imide may be 170° C. or lower, preferably 165° C. or lower, more preferably 160° C. or lower, and still more preferably 155° C. or lower. The glass-transition temperature may be defined based on a midpoint glass transition temperature obtained in accordance with JIS K7121-1987 (testing methods for transition temperatures of plastics). The temperature of the acrylic imide may be varied according to a program such that the temperature is kept at 250° C. for three minutes, lowered to 20° C. at a rate of 10° C./min, kept at 20° C. for three minutes, and then increased to 250° C. at a rate of 10° C./min. Through execution of the program, a curve of the temperature rise measured in the temperature increasing step at the end of the program is obtained. The midpoint glass transition temperature can be calculated from the curve. A differential scanning calorimeter such as the Diamond DSC Differential Scanning Calorimeter manufactured by PerkinElmer Japan Co., Ltd. may be used for the determination of the glass-transition temperature.

The acrylic imide generally has a yellowness index of 5 or less, preferably three or less, more preferably two or less, and still more preferably one or less. The lower the yellowness index, the better. With the acrylic imide having the yellowness index of 5 or less, a film for the interior component of the exterior component of the vehicle is provided with in a preferable color. The yellowness index is measured in accordance with JIS K7105: 1981. A colorimeter "SolidSpec-3700 (trade name)" available from SHIMADZU CORPORATION is an example of a colorimeter.

In view of the extrusion load during the film formation and the molten film stability, a melt mass flow rate (measured in accordance with ISO1133 under the condition of 260° C. and 98.07N) of the acrylic imide is preferably 0.1 to 20 g/10 min, and more preferably 0.5 to 10 g/10 min.

The acrylic imide may further contain, without departing from the scope of the technology, a thermoplastic resin other than the acrylic imide, a pigment, an inorganic filler, an organic filler, a resin filler, an additive such as a lubricant, an antioxidant, a weather-resistance stabilizer, a thermal stabilizer, a mold releasing agent, an antistatic agent, and a surfactant. The amount of the optional component(s) is usually not more than 10 parts by mass, or about 0.01 to about 10 parts by mass, with respect to 100 parts by mass of the acrylic imide.

The film substrate 20 may be from an acrylic imide using the above-described acrylic imide by a known method. A method described in Japanese Patent No. 5865953 is an example of the known method.

The film substrate 20 may be a laminated film including an acrylic imide layer and a thermoplastic resin layer made of a thermoplastic resin other than acrylic imide. Examples of the thermoplastic resin layer include an aromatic polycarbonate layer. Although the acrylic imide layer has high surface hardness, the acrylic imide layer may not have a sufficient impact resistance. In contrast, the aromatic polycarbonate layer has a high impact resistance but the aromatic polycarbonate layer may not has a sufficient surface hardness. By laminating the acrylic imide layer and the aromatic polycarbonate layer, disadvantages of the acrylic imide layer and the aromatic polycarbonate layer are compensated each other. Thus, the film substrate 20 is provided with high surface hardness and a high impact resistance.

Examples of the laminated film including the acrylic imide layer and the aromatic polycarbonate layer include: a multilayer film including an acrylic imide layer and an aromatic polycarbonate layer directly stacked on top of each other; and a multilayer film including a first acrylic imide layer, an aromatic polycarbonate layer, and a second acrylic imide layer stacked in this sequence.

Examples of the aromatic polycarbonate include: a polymer prepared by an interfacial polymerization of phosgene and an aromatic dihydroxy compound, such as bisphenol A, dimethyl bisphenol A, and 1,1-bis(4-hydroxyphenyl)-3,3,5-trimethylcyclohexane; and a polymer prepared by a transesterification reaction of an aromatic dihydroxy compound and a carbonate diester. Examples of the aromatic dihydroxy compound include bisphenol A, dimethyl bisphenol A, and 1,1-bis(4-hydroxyphenyl)-3,3,5-trimethylcyclohexane. An example of the carbonate diester is diphenyl carbonate. The aromatic polycarbonate may be one of the above polymers or a mixture of two or more of the above polymers.

The aromatic polycarbonate may further contain a thermoplastic resin other than the aromatic polycarbonate, a pigment, an inorganic filler, an organic filler, a resin filler, an additive such as a lubricant, an antioxidant, a weather-resistance stabilizer, a thermal stabilizer, a mold releasing agent, an antistatic agent, and a surfactant as long as the aromatic polycarbonate is within the technical scope of the technology described herein. The amount of the optional component(s) should not be more than 10 parts by mass or should be about in a range from 0.01 to 10 parts by mass, with respect to 100 parts by mass of the aromatic polycarbonate.

The laminated film including the acrylic imide layer and the thermoplastic resin layer may be prepared by a known method. A method disclosed in Japanese Patent No. 5893686 may be used for preparing the laminated film that is a multilayer film including a first acrylic imide layer, an aromatic polycarbonate layer, and a second acrylic imide layer stacked in this sequence.

The film substrate 20 has a total light transmittance of 85% or greater, preferably 88% or greater, and more preferably 90% or greater. The higher the total light transmittance, the better. With the film substrate 20 having the total light transmittance of 85% or greater, a film having proper transparency for the interior component or the exterior component is prepared. The total light transmittance is measured in accordance with JIS K7361-1:1997 and a haze meter "NDH2000 (trade name)" manufactured by NIPPON DENSHOKU INDUSTRIES CO., LTD. may be used for the measurement.

The film substrate 20 has a yellowness index of 5 or less, preferably three or less, more preferably two or less, and still more preferably one or less. The lower the yellowness index, the better. With the film substrate 20 having the yellowness index of 5 or less, a film having a color suitable for the interior component or the exterior component is prepared. The yellowness index is measured in accordance with JIS K7105: 1981 and a colorimeter "SolidSpec-3700 (trade name)" manufactured by SHIMADZU CORPORATION may be used for the measurement.

The film substrate 20 has a retardation of 75 nm or less, preferably 50 nm or less, more preferably 40 nm or less, still more preferably 30 nm or less, yet still more preferably 20 nm or less, and most preferably 15 nm or less. The lower the retardation, the better. With the film substrate 20 having the retardation of 75 nm or less, the film having proper transparency for the interior component or the exterior component, particularly a window, is provided. The retardation is measured by a parallel Nicols rotation method and a phase difference analyzer "KOBRA-WR" (trade name) that uses a parallel Nicols rotation method manufactured by Oji Scientific Instruments Co., Ltd. may be used for the measurement.

Figure 5:
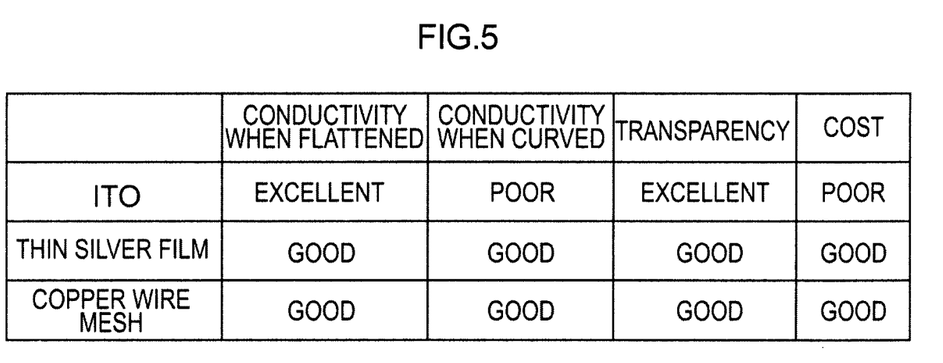
FIG. 5 is a material comparison chart illustrating results of comparison between materials for conductive layers included in the light control film.

Next, a comparison among materials of the conductive layers will be described with reference to FIG. 5. Specifically, the comparison is among ITO used in a common light control film, a thin silver film used in the conductive layer 21 in this embodiment, and a copper wire mesh usable in a conductive layer of a light control film according to the technology described herein. When the light control film including ITO is stretched to fit the complex shape, a crack may be formed in the conductive layer, resulting in a significant reduction in conductivity and a loss of light control function. ITO has high conductivity when flattened and high transparency but does not have flexibility. The light control film including ITO cannot be formed to fit the protrusion 30A of the side panel 30. In contrast, a thin silver film and a copper wire mesh have high flexibility and can be formed to fit the protrusion 30A of the side panel 30 without a loss of the light control function. Furthermore, the cost of the light control film can be reduced by using the conductive layer including silver or copper in comparison to the light control film including ITO because the conductive layer including silver or copper does not include indium that is expensive. Furthermore, the conductive layer 21 including a thin silver film blocks about 50% of light rays having wavelengths longer than wavelengths of infrared light rays, i.e., light rays that heats an object. With the light control film 10, in a temperature rise inside the vehicle 11 including can be suppressed.

As described above, the light control film 10 in this embodiment includes the film substrate 20 and the conductive layer 21. The film substrate 20 includes the acrylic imide layer or the multilayer of the acrylic imide layer and the thermoplastic resin layer. The conductive layer 21 includes the thin silver film or the copper wire mesh. According to the configuration, the light control film 10 is suitable for the interior component or the exterior component of the vehicle.

The inner panel 32 of the side panel 30 includes the panel member 33 and the light control film 10 that is integrated with the panel member 33 by vacuum forming. Specifically, the light control film 10 is bonded to a resin plate that is a base of the panel member 33 before the protrusion 30A is formed. Then, the resin plate and the light control film 10 are held together and heated. The resin plate and the light control film 10 that are heated are pressed against a mold that includes a recess to form the protrusion 30A and portions of the resin plate and the light control film 10 are sucked into the recess of the mold by a vacuum to form the protrusion 30A. The forming temperature of the film substrate 20 including the acrylic imide is about 160° C.; however, the liquid crystal layer 22 has the heatproof temperature of about 100° C. The liquid crystal layer 22 needs to be protected from high temperature so that the temperature of the liquid crystal layer 22 does not exceed the heatproof temperature. In the light control film 10, the liquid crystal layer 22 is sandwiched between the conductive layers 21 each including the thin silver films. The conductive layers 21 have higher thermal conductivity in comparison to the conductive layer including ITO and release heat from the film substrate 20 to the outside. Therefore, a temperature rise in the liquid crystal layer 22 can be suppressed. The light control film 10 including the thin silver film (or the copper wire mesh) in the conductive layer 21 has an advantage in suppression of the temperature increase in the liquid crystal layer 22. Namely, the light control film 10 has advantages in not only formability but also in suppression of the temperature increase. Therefore, the light control film 10 is preferable for application to the vehicle 11.

As described earlier, the light control film including the film substrate made of PET and a conductive layer made of ITO is difficult to be shape along the panel member 33. A gap may be present between the panel member 33 and the light control film bonded to the panel member 33 or the light control function may not to be provided. In the inner panel 32 prepared by the method according to the technology described herein, the light control film 10 is bonded to the panel member 33 without any gaps between the light control film 10 and the panel member 33 even at the first curved portion 33B, the second curved portion 33D, the third curved portion 33F, and the fourth curved portion 33H. Furthermore, the light control film 10 is integrated with the transparent panel member 33 and thus less likely to be recognized by passenger(s) of the vehicle 11.

The light control film 10 may be integrated with an interior-side surface of a door trim of the vehicle 11 and set in the non-transparent state to function as a screen on which rear view images are displayed as if a side mirror. Furthermore, the light control film 10 may be included in an exterior component of a train or a bus. Images may be projected on the light control film 10 in the non-transparent state to use the light control film 10 for a train wrap or a bus wrap.

The side panel 30 may include an upper portion including a transparent solid wall without the side window 13L and the light control film 10 may be integrated with the solid wall. Because the solid wall is transparent, the light control film 10 in the transparent state can pass through light from the outside and function as a window. When the light control film 10 is switched to the non-transparent state, the light control film 10 may scatter the light and function as a screen.

The upper portion of the side panel 30 may include a designed solid wall and the light control film 10 may be integrated with the solid wall. When the light control film 10 is in the transparent state, the passenger in the vehicle 11 can view the designed solid wall. When the light control film 10 is in the non-transparent state, images may be displayed on the light control film 10.

In the vehicle 11, the light control film 10 is switchable between the transparent state and the non-transparent state. However, the light control film 10 may be configured such that the haze percentage gradually varies through control of a voltage applied to the conductive layer 21.

The invention claimed is:

1. A vehicle body panel for a vehicle comprising:
a panel member including at least one flat portion and at least one curved portion; and
a light control film bonded to the panel member without any gaps between the panel member and the light control film, the light control film including:
two film substrates including opposed surfaces opposed to each other;
two conductive layers on the opposed surfaces, respectively; and
a liquid crystal layer sandwiched between the conductive layers, wherein the light control film is switchable between a first state with a first haze percentage and a second state with a second haze percentage that is lower than the first haze percentage,
each of the film substrates includes at least an acrylic imide layer made of acrylic imide,
each of the conductive layers includes one of a thin silver film and a copper wire mesh,
each of the film substrates further includes a thermoplastic resin layer made of a thermoplastic resin other than acrylic imide,
the thermoplastic resin layer has an impact resistance higher than that of the acrylic imide layer,
the at least one flat portion includes a first flat portion, a second flat portion, and a third flat portion,
the at least one curved portion includes a first curved portion and a second curved portion having a first degree of curvature and a second degree of curvature, respectively,
the first degree of curvature and the second degree of curvature are different from each other,
the second flat portion is perpendicular to the first flat portion,
the third flat portion is at an angle relative to at least the second flat portion,
the first curved portion extends from the first flat portion and curves toward the second flat portion,
the first curved portion connects the second flat portion to the first flat portion,
the second flat portion extends from an end of the first curved portion on an opposite side from the first flat portion,
the second curved portion extends from an end of the second flat portion on an opposite side from the first curved portion and curves toward the third flat portion,
the second curved portion connects the third flat portion to the second flat portion, and
the third flat portion extends from an end of the second curved portion on an opposite side from the second flat portion.

2. The vehicle body panel according to claim 1, wherein the thermoplastic resin layer is an aromatic polycarbonate layer made of aromatic polycarbonate.

3. The vehicle body panel according to claim 1, wherein
the panel member includes an outer panel in a flat plate shape and an inner panel opposed to the outer panel,
the outer panel is made of resin and substantially transparent,
the inner panel is made of resin and substantially transparent,
the at least one flat portion and the at least one curved portion are included in the inner panel,
the first flat portion is vertically oriented in a cabin of the vehicle and fixed to the outer panel,
the first curved portion curved toward an inner side of the cabin,
the second flat portion extends from the end of the first curved portion toward the inner side of the cabin, and
the light control film is bonded to a surface of the inner panel facing an interior space of the cabin.

4. The vehicle body panel according to claim 3, wherein
the at least one flat portion further includes a fourth flat portion and a fifth flat portion,
the fifth flat portion is vertically oriented in the cabin of the vehicle and fixed to the outer panel, the at least one curved portion further includes a third curved portion and a fourth curved portion having a third degree of curvature and a fourth degree of curvature, respectively, the first degree of curvature, the second degree of curvature, the third degree of curvature, and the fourth degree of curvature are different from one another, the third curved portion extends from an end of the third flat portion on an opposite side from the second curved portion and curves toward the fourth flat portion, the third curved portion connects the fourth flat portion to the third flat portion, the fourth flat portion extends from an end of the third curved portion on an opposite side from the third flat portion toward the outer panel, the fourth curved portion extends from an end of the fourth flat portion on an opposite side from the third curved portion and curves toward the fifth flat portion, the fourth curved portion connects the fifth flat portion to the fourth flat portion, and the fifth flat portion extends from an end of the fourth curved portion on an opposite side from the fourth flat portion.

5. The vehicle body panel according to claim 1, wherein each of the film substrates has a total light transmittance of 90% or greater.

6. The vehicle body panel according to claim 1, wherein each of the film substrates has a yellowness index of 1 or less.

7. The vehicle body panel according to claim 1, wherein each of the film substrates has a retardation of 15 nm or less.

* * * * *